April 23, 1929.   R. D. BAKER   1,710,082
WORK HOLDING DEVICE
Original Filed April 6, 1922   2 Sheets-Sheet 1
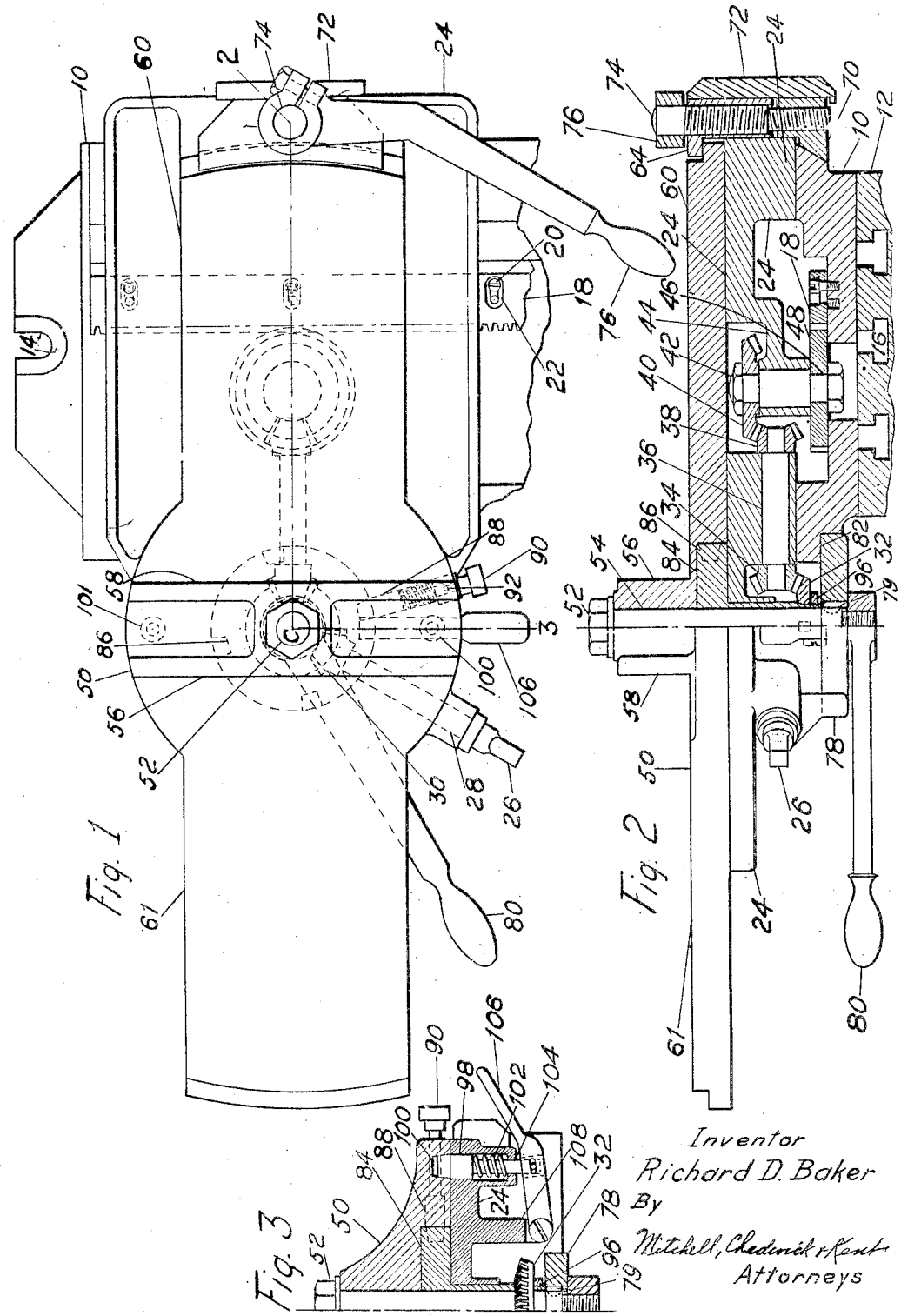

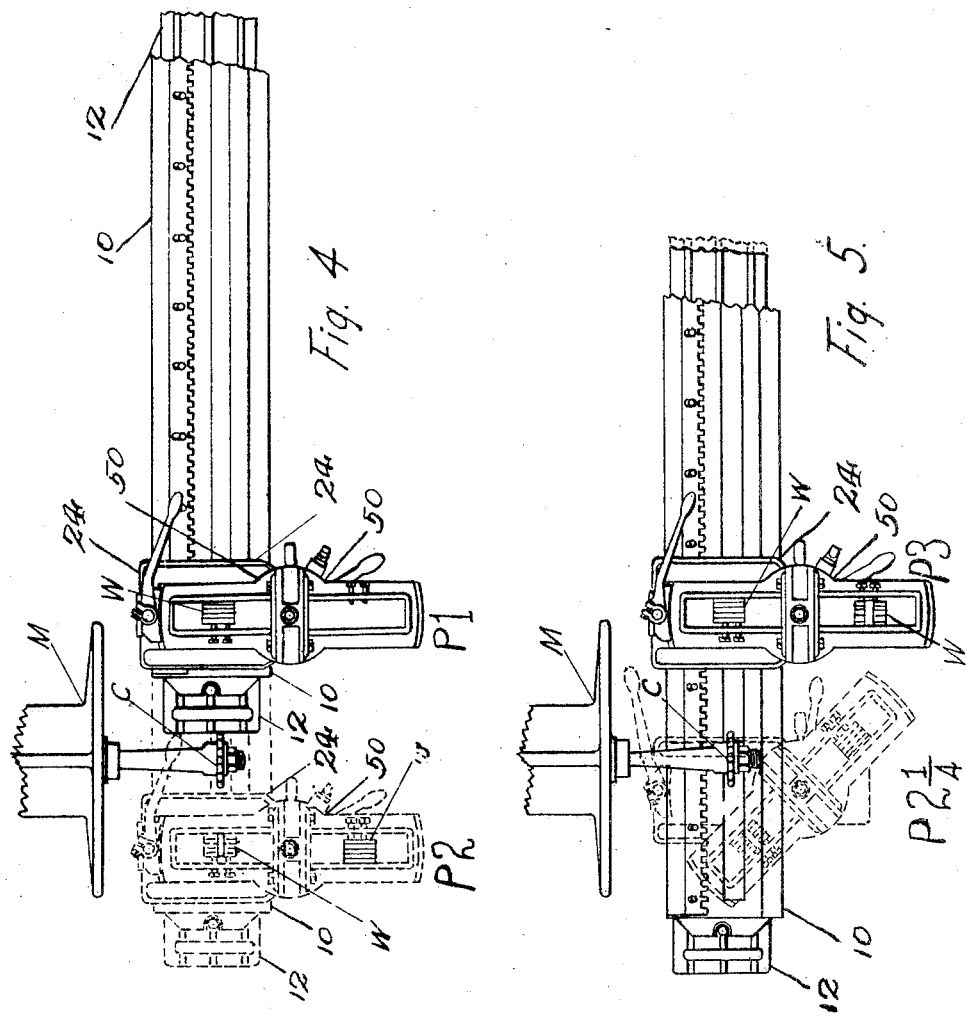

Patented Apr. 23, 1929.

1,710,082

UNITED STATES PATENT OFFICE.

RICHARD D. BAKER, OF PITTSFIELD, MASSACHUSETTS, ASSIGNOR TO THE PITTSFIELD MACHINE & TOOL COMPANY, OF PITTSFIELD, MASSACHUSETTS, A CORPORATION OF NEW JERSEY.

WORK-HOLDING DEVICE.

Application filed April 6, 1922, Serial No. 550,059. Renewed July 28, 1927.

This invention relates to work holding devices. It is especially suited for use on metal working machines having a bed or table by which the work is brought to the cutting tool. In the embodiment herein illustrated, the device is adapted for use on a milling machine, but the invention may be applied to movable work tables of other machines.

In operating the ordinary type of milling machine, it is customary when a number of duplicate pieces are to be handled as in ordinary commercial production, to place the work in some sort of holding fixture attached rigidly to the traveling table of the machine. The fixture is first properly set so that the work will come to the cutter, after which the table is mechanically fed and the work acted on by the tool. When the cutting operation has been completed, that is, when the work has been passed by the tool, the feed of the table is stopped and the work removed. Before new work can be attached to the fixture, it is necessary thus to remove the work and to return the table past the tool to its initial position, after which the next piece may be put on and the operation repeated. The machine is thus idle while the operator is removing the old work, attaching the new, and then setting or adjusting the machine, all of which in many cases requires a considerable part of the time of the complete operation; and then the operator is ordinarily unoccupied while the machine is doing the cutting.

The sizes of milling machines in most common use and the sizes of work mostly handled thereon are such that the entire length of travel of the table is but infrequently used. Often only a short travel suffices to carry the work past the tool; thus necessitating frequent stoppage of the table and return to its initial position.

An important object of the invention is to provide means whereby both the machine and the operator may perform their respective functions simultaneously, thus effecting a considerable saving of time and materially increasing the production of the machine. Another object is the provision of means whereby a continuous advance of the machine table throughout its entire length of travel may be utilized for machining successive pieces of work, there being provision for removing and attaching work while the machine is in effective operation and the table advancing.

These objects are accomplished in part by the consolidation of return movements of the machine table, and consequent elimination of the frequency of the stop-return-and-start-again action and in part by mechanism which permits the operator to replace completed work with new work, while still other work is being acted on by the tool. In the specific embodiment of the invention herein shown the mechanism comprises a work holding device adapted to hold two or more pieces of work simultaneously one of which may be undergoing operation of the tool while the other is being removed or is being set. The mounting of this device enables it to be set in a series of positions along the feed table of the machine, which in ordinary operation, is actuated through approximately its longest possible travel, and then is returned for a repetition of the same. During its forward movement, when a piece of work has been fed by it past the tool, and is still close thereto having barely cleared the tool, the actuation of the apparatus of the invention causes one work holder, carrying said work, to move away from the tool to a convenient place for refilling and causes another holder which has been made ready with a fresh similar piece of work, to be set close to the tool on the approach side in the line of feed. This movement both gets the holder away from the tool promptly where the operator has plenty of room for changing the work and gets it out of the line of feed so that in its retrograde movement it passes the tool without inconvenience. The described movement of the turntable is effected by providing a rack and gear, the rack being on the machine feeding bed and the gear being connected by a train of gears with the center of rotation of the turn table, so that as said gear rolls in the retrograde direction on the rack, a predetermined rotation of the turn table occurs which is precisely sufficient to move the work holder, first to the refilling position and later, on another movement, to the tool-approach position.

As various applications of the invention may be made without departing from the principles thereof, the embodiment herein shown and described is to be considered as merely illustrative and it is intended that the patent shall cover, by suitable expression in the appended claims, whatever features of patentable novelty exist in the invention disclosed.

In the drawings,

Figure 1 is a plan of a device embodying the invention, with a portion of the base section broken away;

Figure 2 is an elevation, partly in section on line 2ᶜ of Fig. 1, showing the device mounted on a machine feed table;

Figure 3 is an elevation in section on line 3ᶜ of Fig. 1, showing the details of the positioning plunger; and Figures 4 and 5 are plan views showing the relative positions of the tool, feed table and work holding device during operation of the machine through a single cycle of its forward travel.

Referring to the drawings the device is shown with its base 10 resting on the work table or bed 12 of a machine tool such as a milling machine. It is assumed herein that this bed is machine-fed, although obviously it may also be fed by hand which for purposes hereof would be equivalent; and it is assumed that the apparatus to be described is an attachment thereto, although it will be obvious that it might be built as a regular part thereof, not detachable, without departing from the scope of the invention. The base 10 may be constructed in any desired length to fit the particular bed of the machine on which it is to be used, it being advantageous to proportion the base so that its extremities may be bolted close to the ends of the machine bed. Attachment may be made with conventional T-bolts using a notch 14 of the fixture and a T-slot 16 of the machine table. An extended rack 18 is secured to the upper side of the fixture base by means of binding screws 20, passing through slots 22, cut in the rack at right angles to the table travel, thus making the rack adjustable transversely of the base. On the latter a return travel table 24 is mounted so as to be slidable longitudinally thereon with provision for clamping it rigidly thereto when desired as will hereinafter appear. This return travel table may be moved along the base by turning a hand crank on the squared end 26 of the shaft 28 which, through a train of gearing, rotates a gear 48 in mesh with the rack 18. As illustrated, the train consists of bevel gear 30 fixed on the shaft 28 and in mesh with another bevel 32 engaged with a similar gear 34 fast on a horizontal shaft 36 journaled in the return travel table and terminating in a projecting portion on which is secured bevel 38 which meshes with the bevel pinion 40 attached to the vertical shaft 42, journaled in a bearing of a projecting arm 44 of the travel table. On the lower extending portion 46 of this shaft 42 is gear 48, which preferably is changeable, so that gears of differing diameters may be employed; for meshing with which the rack 18 is adjustable as previously described. It is manifest that through the gearing, and by turning shaft 28, the travel table may be moved to any position on the base section in either direction of the travel of the latter, which is fast to and moves with the machine bed. Means, other than the hand crank and shaft 28 are also provided for actuating the train of gearing just described, to effect a predetermined movement of the travel table, which means will be described more particularly later.

Resting on the return travel table 24 is a turn table 50 adapted to revolve about a vertical stud 52. This turn table has a hub portion extending upward forming a substantial bearing 54 for the center stud and from which hub extend ribs having vertical faces 56 and 58 to which work-holding clamps may be secured. Other means of holding work on the table 50 may also be provided as desired. The turn table has two horizontal surfaces 60 and 61, having the aspect of arms, extending in opposite directions from the hub upon which the work may be placed. For clearness in the drawings, the specific slots, holes, ridges, or clamps that may be on these arms for engaging the work are omitted, and the arm itself typifies the work holder. The segmental edges of these arm portions of the table pass under the upper jaw 64 of a clamp whose under jaw 70 has a beveled face adapted to engage a complementary beveled under edge of the fixture base 10. These jaws are blocks held loosely in position by a suitable support 72 secured to the return travel table by fastenings not shown; and passing through the blocks is a right and left threaded screw 74 of rather sharp pitch, to the upper projecting end of which is secured the clamping handle 76. A slight movement of the handles tends to draw the blocks together, causing the upper one to press the turn table upon the travel table and the latter upon the base, the other block being brought up tightly against the inclined face of the base. It is thus evident that the edge of the work holding turn table can be rigidly secured by a short throw of the handle 76.

The central portion of the turn table may also be clamped firmly to the base 10, in the following manner. The head of the center stud 52 rests upon the hub section of the turn table and its shank, after passing through the turn table and a portion 78 of the travel table, to which portion the stud is non-rotatably connected by key 79, terminates in a threaded extension on which is rotatably mounted a second clamping handle 80. This handle when turned about the threads on the stud 52 brings up against the portion 78 of the travel table which in turn rests against a shoulder 82 of the fixture base. Turning the handle 80 in the proper direction, draws the stud down forcing the turn table upon the travel table and the latter upon the base. Great rigidity of the device is thus secured by clamping the turn table, travel table and base fast together at front and back of the base. As regards the turn table these clamps are on both sides of the place where the work being machined is held.

With the clamps loosened the turn table may be revolved about the stud 52 into any angular position, but since the ordinary location of the turn table when the work is being machined, is with either the arm 60 or the arm 61 extending transversely across the direction of movement of the travel table, there is provided means whereby the turn table may be locked in either of these respective positions. These means comprise a plunger 98 (Fig. 3) slidable within a chamber of the travel table 24, into or out of engagement with sockets 100 or 101 so located upon the under side of the turn table, that when the plunger is inserted in one of them an arm of the turn table will be across the travel table at right angles to its line of travel. The positioning plunger 98 is held in either socket by a spring 102 surrounding a reduced portion 104 of the plunger and seating against the bottom of the chamber in the travel table. This reduced portion 104 extends through the bottom and connects with a lever 106 fulcrumed on a projection 108 of the travel table. Depression of this lever withdraws the plunger from the socket in the turn table, and allows the latter to be rotated.

The rotation of the turn table, however, is utilized to effect movement of both itself and the travel table along the base of the device. This is accomplished by providing suitable connection between the turn table and the chain of gearing previously described in its relation to the travel table, whereby upon rotation of the turn table the gear 48 is caused to roll along the rack 18.

Within a recess in the turn table, on its under face at the center, is a flat circular plate 84 having distributed about its periphery a plurality of sockets 86, into any of which may be seated a spring bolt 88, comprising a plunger housed in the turn table, and a handle 90 extending outside the edge thereof. This bolt when seated locks the turn table and plate together. Extending downward from the plate 84 between the stud 52 and the travel table is a tubular hub to the end of which is secured the bevel gear 32 by nut 96. With the plate and turn table locked together, by the bolt 88, rotation of the table causes similar movement of the gear 32, and, as heretofore explained, in describing the chain of gearing of which gear 32 is an element rotation of this gear effects longitudinal movement of the travel table and with it the turn table along the base. Upon withdrawing the locking bolt 88, by its handle 90, it may be revolved slightly on its own axis so that a pin 92 projecting from it and normally located so as to be seated in a slot of the turn table, will rest beside the entrance to its slot thus preventing the return of the plunger. While it is thus held withdrawn the plate and under parts can be rotated without turning the turn table, thus permitting movement of the turn table and travel table along the base, by means of a hand crank on shaft 28, without rotation of the turn table.

In Figures 4 and 5 four relative positions of a milling machine M with cutter C, and the work-holding device of the present invention, during an operating cycle are shown, the order of occurrence being indicated by the numbers P1, P2, P2¼ and P3. The work first attached is indicated by the letter W and the work next attached is indicated by the letter w.

In operation, work is secured by any suitable holding means on both arms of the turn table, 50 which arms successively are located by the positioning plunger with precision so as to extend across the base 10 with the work thereon in the proper line of travel toward the tool C. The clamping handles then make all parts fast with the base section 10, which has previously been made rigid on the machine feed bed 12. The bed feed is then thrown in (position P1) and the work W is passed under the cutting tool. While the work is being machined, the operator is busy at the opposite end of the turn table, securing new work w thereon in a position predetermined so that when turned this work will be in proper alignment for operation of the tool. As soon as the work undergoing operation has passed by the cutter (position P2) the operator loosens the clamping handles, depresses the handle of the positioning plunger and revolves the turn table a half circle. The relation of the elements when this half-revolution has been one-quarter completed is shown as position P2¼. This semi-revolution of the turn table, not only swings the new work around into the line of the cutter, but simultaneously by means of the gearing returns the travel table relative to the advance which the machine bed has had, carrying back with it the turn table, to its initial position (position P3) on the approach side of the cutter. The new work is thus positioned for advance against the tool with the continued feed movement of the machine table. This return and positioning is effected as follows: The turn table being held fast to the plate 84 by the locking bolt 88 that plate with its hub and bevel gear 32 revolve with the turn table. Through the train of gears already described, the gear 48 is revolved and, being in mesh with the rack 18 which is fixed on the base, rolls backward on that rack, carrying with it the return travel table and the turn table. The return travel table in so moving slides upon the base section in a direction opposite to the travel of the machine bed. The latter may be assumed to be moving forward at the customary slow pace; and it may be further assumed, for the particular method of operation that is being described, that its motion continues while the turn table is being rotated backward. The rotation of the latter is a rapid matter, executed by hand, and may be executed so rapidly that meanwhile the continuously feeding machine table will travel but a short distance. The distance which the return travel table must be arranged to go during the half revolution depends upon the length of travel requisite for the cutting operation of the tool, plus suitable clearance before and after, and plus the distance which the machine table moves forward during the time allotted for completing the return of the return travel table. Often this latter increment may be small; but if it is considerable in any case, or if the time of executing the return is uncertain, or if the execution of the operation in this manner is considered dangerous, the operation of the feed of the machine bed may be stopped during the return of the return travel table and started again when that has been completed, at which time the positioning of the new work has become automatically correct for operation of the cutting tool.

It will be evident that for different sizes of work the retrograde movement of the device must be different, and this is arranged for by making interchangeable travel gears 48 so that gears of various diameters may be used, the rack being adjustable to and from the axis of gear 48 as already described to accommodate gears of different diameter. When the turn table has been revolved until the seat which was not engaged has reached the positioning plunger, the latter springs into the seat as a latch, preventing further rotation. The clamping handles then are tightened; and the new work feeds along to the tool. While it is passing the tool, the operator removes the finished work from that arm of the turn table which has been revolved into conveniently accessible position, and inserts new, thus completing the cycle of operations. This cycle may be repeated until the travel table may be near the other end of the machine bed from that at which it started. The machine bed is then returned to its original position in the usual way; and the travel table is moved back to that end of the machine bed where it originally was, to wit, its forward end. To do this latter, the clamping handles of the holding device are released, and the plate locking bolt 88 is withdrawn, thus freeing the plate from the turn table so as to permit the former and its bevel gear 32 to be turned by a hand crank (to be placed on the shaft 28) without rotating the turntable. The travel table carrying the turn table, having been moved along to one end of the base of the fixture by the crank and gearing, the locking bolt is returned to whatever seat in the plate is most convenient, the clamping handles are tightened, and the device is ready again for operation.

A large part of machine work is on small pieces, for which a short travel of the machine bed or table is sufficient. Regardless of the length of travel required for the work up to the limit a machine will take, the device enables a machine bed to move its full length without stopping. During this movement the work holders and their support have a step by step backward travel along the base of the device and hence along the machine bed, which is also the feeding bed. During the intervals between these backward steps, from a departing position on one side of the tool to a position of approach on the other side of the tool, the work holders are carried forward with the bed, thus recovering the distance traversed during the backward steps. If the step backward occurs while the machine bed is moving continuously forward, the travel of the bed which occurs during this backward step, i. e. while the turn table is being revolved, is not utilized. This loss is not great, and even this may be avoided by stopping the bed when the work has passed the tool, and holding it still while the step backward of the work holders along the bed is effected. There is a further large saving due to that feature of the invention by which new work takes the place of old on the turn table, while the tool is at work; and by which the work newly set comes automatically to a proper position with small clearance from the tool.

I claim as my invention:

1. The combination, in a machine tool having a fixed cutter and a work bed having a relatively long feeding travel, of a support mounted on the bed selectively to slide along a line parallel with the travel of the bed or to be fixed thereto; a table pivotally mounted on the support and having work holders spaced around its pivotal axis; a rack on the bed; a gear fixed to rotate with the table; and means on the support connecting the gear and rack whereby rotation of the table moves said support and table along the bed in a direction opposite to the feed of the bed and moves one of said workholders out of and another of said work holders into the path of the tool.

2. A work holding fixture for a machine tool having a work-feeding bed, comprising a base adapted to be secured rigidly on the work bed of the machine; a support reciprocable on said base in the direction of the feed of the bed and adapted intermittently to be held rigid on the base; a table rotatable on the support and adapted to hold work at a plurality of locations around its axis; and gearing between the table and the base whereby a rotation of the table and a retrogression of the support on the base occur together with one of the work holders thereby moving into the path of feed of the bed to the tool.

3. The combination in a machine having a tool fixed in operating position and a work bed with relatively long feeding travel, of a support mounted movably on the bed, with means to lock it rigidly thereon for movement with the bed in feeding direction, and means to move it in the opposite direction on the bed when unlocked; a table rotatably mounted on the support and adapted to hold work at a plurality of locations around the axis; and connecting means whereby a rotation of the table and a retrogression of the support occur simultaneously, whereby a work location which has been fed past the tool revolves out, from the path of bed feed in the rear of the tool, simultaneously with the revolving of another work location into the said path before the tool.

4. The combination in a machine tool having a fixed cutter and a work bed and a relatively long feeding travel, of a support mounted on the bed selectively to slide along a path parallel with the travel of the bed or to be fixed thereto; a table pivotally mounted on the support and having work holders spaced around its pivotal axis; clamping jaws adapted to clamp rigidly together the table, the support and the bed; and gearing between the table and bed whereby a rotation of the table and a retrogression of the support on the bed occur together, when unclamped, with one of the work holders thereby moving into the path of the tool.

5. The combination in a machine tool having a fixed cutter and a reciprocable work bed with relatively long feeding travel, of a reciprocable support mounted on the bed selectively to slide along a line parallel with the travel of the bed or to be fixed thereto; a table pivotally mounted on the support and having work holders spaced around its pivotal axis; gearing between the table and the bed whereby a rotation of the table and a retrogression of the support on the bed occur together with one of the work holders thereby moving into the path of the tool; and means disconnecting said gearing so that a retrogression of the bed and relative progression of the support may occur without rotation of the table.

Signed at Pittsfield, Mass., this fourth day of April, 1922.

RICHARD D. BAKER.